United States Patent
Moon et al.

(10) Patent No.: US 10,920,829 B2
(45) Date of Patent: Feb. 16, 2021

(54) THRUST BEARING COOLING DEVICE

(71) Applicant: Hyundai Electric & Energy Systems Co., Ltd., Seoul (KR)

(72) Inventors: Sung-Hyun Moon, Seoul (KR); Kwang-Jin Han, Seoul (KR); Nam-Uk Cho, Seoul (KR)

(73) Assignee: Hyundai Electric & Energy Systems Co., Ltd., Seoul (KR)

( * ) Notice: Subject to any disclaimer, the term of this patent is extended or adjusted under 35 U.S.C. 154(b) by 0 days.

(21) Appl. No.: 16/609,316

(22) PCT Filed: Jun. 21, 2018

(86) PCT No.: PCT/KR2018/006992
§ 371 (c)(1),
(2) Date: Oct. 29, 2019

(87) PCT Pub. No.: WO2018/236154
PCT Pub. Date: Dec. 27, 2018

(65) Prior Publication Data
US 2020/0056663 A1    Feb. 20, 2020

(30) Foreign Application Priority Data
Jun. 21, 2017   (KR) .................. 10-2017-0078688

(51) Int. Cl.
*F16C 37/00* (2006.01)
*F16C 33/66* (2006.01)
*F16C 19/30* (2006.01)

(52) U.S. Cl.
CPC .......... *F16C 37/007* (2013.01); *F16C 33/667* (2013.01); *F16C 33/6666* (2013.01); *F16C 19/30* (2013.01); *F16C 2300/34* (2013.01)

(58) Field of Classification Search
CPC .. F16C 37/0007; F16C 19/30; F16C 33/6666; F16C 33/667; F16C 2300/34; H02K 9/06; H02K 5/16; F16N 39/02
See application file for complete search history.

(56) References Cited

U.S. PATENT DOCUMENTS

| 2,249,021 A | | 7/1941 | Mchugh | |
| 4,073,596 A | * | 2/1978 | Erickson | F04D 1/12 415/112 |
| 2012/0049665 A1 | * | 3/2012 | Garriga | F16C 35/042 310/54 |

(Continued)

FOREIGN PATENT DOCUMENTS

| CA | 1116672 A | 1/1982 |
| CN | 103851089 A | 6/2014 |

(Continued)

*Primary Examiner* — Alan B Waits
(74) *Attorney, Agent, or Firm* — Mintz Levin Cohn Ferris Glovsky and Popeo, P.C.; Peter F. Corless

(57) ABSTRACT

The purpose of the present disclosure is to provide a thrust bearing cooling device which can improve the cooling efficiency of a thrust bearing. A thrust bearing cooling device comprising: a fluid storage tank in which a thrust bearing is installed and a fluid is stored, an outer surface of the fluid storage tank being exposed to external air; and at least one heat exchange fin provided in the fluid storage tank.

15 Claims, 4 Drawing Sheets

(56) References Cited

U.S. PATENT DOCUMENTS

2012/0049668 A1* 3/2012 Garriga ................ F16C 35/042
                                                        310/59
2014/0093201 A1  4/2014 Hashish
2014/0271284 A1  9/2014 Gray et al.

FOREIGN PATENT DOCUMENTS

| JP | 61-152894       | 9/1986  |
|----|-----------------|---------|
| JP | H04-60217 A     | 2/1992  |
| JP | H05-312218 A    | 11/1993 |
| JP | H09-014277 A    | 1/1997  |
| JP | 2004-088875 A   | 3/2004  |
| KR | 10-2011-0000047 A | 1/2011 |
| KR | 10-1054749 B1   | 8/2011  |
| KR | 10-20120003205 A | 1/2012 |
| KR | 10-1736268 B1   | 5/2017  |

* cited by examiner

THRUST BEARING COOLING DEVICE

CROSS-REFERENCES TO RELATED APPLICATIONS

This application is a 35 U.S.C. § 371 U.S. national entry of International Application PCT/KR2018/006992, having an International filing date of Jun. 21, 2018, which claims priority under 35 U.S.C. § 119 the benefit of Korean Application 10-2017-0078688 filed on Jun. 21, 2017. The entire contents of these applications are incorporated herein by reference in their entirety.

TECHNICAL FIELD

The present disclosure relates to a thrust bearing cooling device, and more particularly, to a thrust bearing cooling device in which a thrust bearing is primarily cooled by circulating a lubricating and cooling fluid, and secondarily cooled by exchanging heat between the fluid and air.

BACKGROUND ART

Vertical electric motors that provide rotational force to load devices such as pumps should support relatively high thrust loads occurring in the load devices.

A thrust bearing may be applied to a rotary shaft of the electric motor, to reduce friction of the rotary shaft of the electric motor, as well as to support the thrust loads therefrom.

Since such a thrust bearing receives relatively high thrust loads, friction loss may occur, and energy lost in the friction loss may be converted into heat energy, and the heat energy may act as a heat source for raising a temperature of the thrust bearing.

In addition, if the temperature of the thrust bearing is increased, components may be deteriorated and damaged. Therefore, a problem in which the maximum allowable support load of the bearing itself is reduced may occur.

Therefore, as a technique for lubricating and cooling the thrust bearing, there is a cooling device configured to immerse the thrust bearing in oil stored in an oil tank.

A thrust bearing cooling device equipped with an oil tank is disclosed in Korean Patent Publication No. 10-2012-0003205.

The thrust bearing cooling device including such an oil tank circulates a lubricating oil performing lubrication and cooling functions, in the oil tank, by using suction force generated in rotating the thrust bearing, to cool the thrust bearing, and heat exchange the oil tank with external air to cool the lubricating oil.

However, the thrust bearing cooling device according to the prior art has a disadvantage in that the heat exchange ratio between the lubricating oil and the oil tank is relatively low, and the heat exchange ratio between the oil tank and the external air is relatively low, because the oil tank is formed in a simple box shape.

(Patent Literature) KR 10-2012-0003205 A (Jan. 10, 2012)

DISCLOSURE

Technical Problem

The present disclosure has been made to solve at least some of the problems of the prior art as described above, and, an aspect of the present disclosure is to provide a thrust bearing cooling device in which cooling efficiency of a thrust bearing is improved.

Technical Solution

According to an aspect of the present disclosure, a thrust bearing cooling device includes: a fluid storage tank in which a thrust bearing is installed and a fluid is stored, an outer surface of the fluid storage tank being exposed to external air; and at least one heat exchange fin provided in the fluid storage tank.

According to another aspect of the present disclosure, a thrust bearing cooling device includes: a fluid storage tank in which a thrust bearing is installed and a fluid is stored, an outer surface of the fluid storage tank being exposed to external air; and at least one lower heat dissipating fin provided on a lower surface of a bottom portion of the fluid storage tank.

According to another aspect of the present disclosure, a thrust bearing cooling device includes: a fluid storage tank in which a thrust bearing is installed and a fluid is stored, an outer surface of the fluid storage tank being exposed to external air; at least one heat exchange fin provided on an inner side surface of a bottom portion of the fluid storage tank; and at least one lower heat dissipating fin provided on a lower surface of the bottom portion of the fluid storage tank.

Advantageous Effects

According to an aspect of the present disclosure having such a configuration, the cooling efficiency of the thrust bearing may be improved, and the life span of the thrust bearing and the maximum allowable supporting load may increase.

BEST MODE FOR INVENTION

The terminology used herein is for describing particular embodiments only, and is not to be used to limit the present disclosure. Further, the singular forms, such as the forms starting with the articles "a," "an," and "the" are intended to include the plural forms as well, unless the context clearly indicates otherwise.

Various embodiments of the present disclosure will now be described with reference to the accompanying drawings.

First, with reference to FIGS. 1 and 2, a specific configuration of a thrust bearing cooling device 100 according to an embodiment of the present disclosure will be described.

Figure 1:
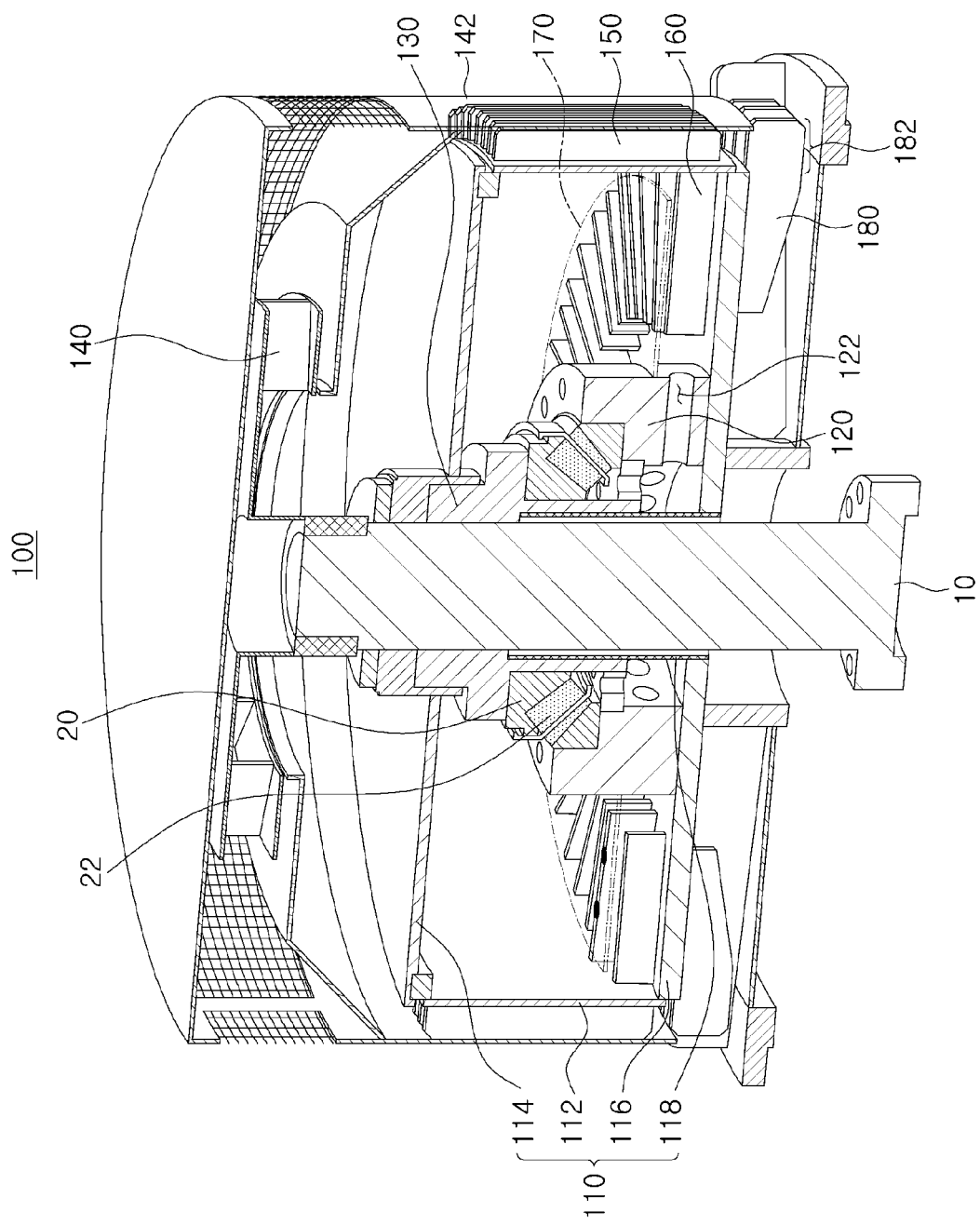
FIG. 1 is a cross-sectional perspective view of a thrust bearing cooling device according to an embodiment of the present disclosure.
Figure 2:
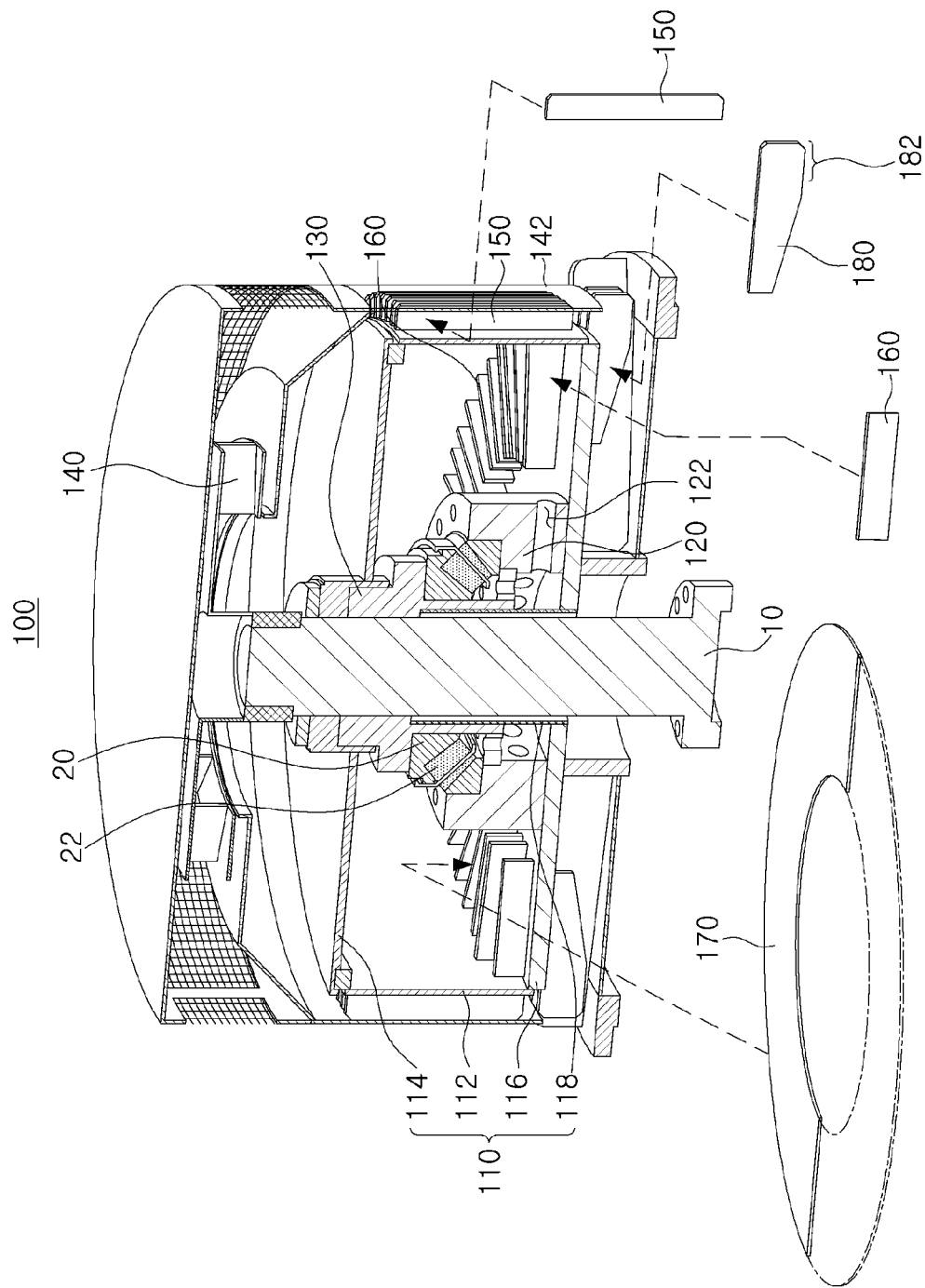
FIG. 2 is an exploded perspective view in which a heat exchange fin, a fluid guide, a lower heat dissipating fin, and a side heat dissipating fin included in the thrust bearing cooling device illustrated in FIG. 1 are separated one by one.

As illustrated in FIGS. 1 and 2, a thrust bearing cooling device 100 according to an embodiment of the present disclosure may include a fluid storage tank 110, a bearing seat 120, a bearing runner 130, a cooling fan 140, a fan guide 142, a side heat dissipating fin 150, a heat exchange fin 160, a fluid guide 170, and a lower heat dissipating fin 180.

For reference, FIGS. 1 and 2 illustrate a structure in which a thrust bearing 20 is installed on an upper portion of a rotary shaft 10 of a vertical electric motor, but are not limited thereto. The thrust bearing 20 may be also installed on a lower portion of the rotary shaft 10 of the vertical electric motor.

The fluid storage tank 110 may be a box-shaped member in which a fluid may be stored, and an outer surface of the fluid storage tank may be exposed to external air.

The thrust bearing 20 may be installed in a central portion of the fluid storage tank 110, to be immersed in the fluid stored in the fluid storage tank 110. The rotary shaft 10 of the vertical electric motor coupled to the thrust bearing 20 may be disposed to pass through the central portion of the fluid storage tank 110.

In this case, the fluid may be lubricating oil in the thrust bearing 20. This fluid may flow into an inner wheel of the thrust bearing 20 by suction force of a bearing roller 22 generated in rotating the bearing roller 22 of the thrust bearing 20 due to rotation of the rotary shaft 10, and may then flow out of an outer wheel of the thrust bearing 20, such that the fluid may be circulated via the thrust bearing 20 in the fluid storage tank 110.

In an embodiment, the fluid storage tank 110 may include a side wall 112 having a cylindrical shape, a ceiling portion 114 for sealing an upper end of side wall 112, a bottom portion 116 for sealing a lower portion of the side wall 112, and a sleeve 118 extending in an upward direction to surround the rotary shaft 10 in the bottom portion 116.

The bearing seat 120 may be provided in the fluid storage tank 110, and may fix the thrust bearing 20 to the bottom portion 116 of the fluid storage tank 110.

In an embodiment, the bearing seat 120 may be configured in a cylindrical shape in which the thrust bearing 20 is coupled to an upper portion of the bearing seat. In this case, a space may be formed between an inner side surface of the bearing seat 120 and the sleeve 118 of the fluid storage tank 110.

In addition, the bearing seat 120 may have a fluid flow hole 122 formed to pass through from an outer side surface of the bearing seat to an inner side surface of the bearing seat in a radial direction of the bearing seat 120. In this case, the fluid flow hole 122 may be formed, in plural, at intervals in a circumferential direction of the bearing sheet 120.

In an embodiment, the fluid flow hole 122 may be formed to be horizontal to the ground, such that the fluid flows smoothly, but is limited thereto.

The bearing runner 130 may be provided inside the fluid storage tank 110, and may rotatably support a rotary wheel of the thrust bearing 20 with respect to the ceiling portion 114 of the fluid storage tank 110. The bearing runner 130 may mediate coupling between the rotary wheel of the thrust bearing 20 and the rotary shaft 10 of the vertical electric motor.

The cooling fan 140 may be disposed above the fluid storage tank 110, and may be fastened to the rotary shaft 10 of the vertical motor. The cooling fan 140 may be rotated by rotation of the rotary shaft 10, to generate an air flow rubbing against the outer surface of the fluid storage tank 110.

The fan guide 142 may surround the fluid storage tank 110 and the side heat dissipating fin 150 to be described later, and may guide an air flowing by suction force of the cooling fan 140 to the cooling fan 140. In an embodiment, the fan guide 142 may be configured in a cover shape covering the fluid storage tank 110, and a lower end of the fan guide may extend in a downward direction, to concentrate the air on the outer surface of the fluid storage tank 110 and the side heat dissipating fin 150.

The side heat dissipating fin 150 may be provided on an outer surface of the side wall 112 of the fluid storage tank 110, and may exchange heat with the external air.

In an embodiment, the side heat dissipating fin 150 may be formed in a vertical direction, depending on a flow direction of the air flowing by the cooling fan 140. In addition, the side heat dissipating fins 150 may be provided, in plural, at intervals along a circumference of the fluid storage tank 110.

The heat exchange fin 160 may be provided in the fluid storage tank 110, may exchange heat with a fluid stored in the fluid storage tank 110, and may transfer heat to the fluid storage tank 110. This heat exchange fin 160 may increase a heat exchange area between the fluid and the fluid storage tank 110.

In an embodiment, the heat exchange fin 160 may be coupled to the bottom portion 116 of the fluid storage tank 110, and may be disposed, in plural, at intervals in the circumferential direction of the thrust bearing 20.

The plurality of heat exchange fins 160 may be provided in a radial direction with respect to the thrust bearing 20, depending on a flow direction of a fluid circulating in the fluid storage tank 110.

In addition, in an embodiment, the plurality of heat exchange fins 160 may be disposed such that an inner end thereof faces the fluid flow hole 122 formed in the bearing seat 120. Through this configuration, the fluid may exchange heat with the heat exchange fin 160, and may be guided to the fluid flow hole 122 by the heat exchange fin 160, such that the circulation flow of the fluid may be smoother.

In this configuration, when the inner end of the heat exchange fin 160 extends to a position near the bearing seat 120, a flow path through which the fluid flows into the fluid flow hole 122 of the bearing seat 120 may be divided into a plurality of sections. Therefore, flow of the fluid flowing into the fluid flow hole 122 may not be smooth.

Therefore, the inner end of the heat exchange fin 160 may be spaced apart from the bearing sheet 120, to smoothly flow the fluid around the outer side surface of the bearing sheet 120.

Also, in an embodiment, the heat exchange fin 160 may extend to a position in which the outer end is adjacent to the side wall 112 of the fluid storage tank 110, to increase the heat exchange area. The outer end of the heat exchange fin 160 may be spaced from the side walls 112 of the fluid storage tank 110, not to divide the flow path of the fluid into a plurality of sections.

The fluid guide 170 may be a plate-like member covering the upper portions of the plurality of heat exchange fins 160. The fluid guide 170 may guide a fluid discharged from the thrust bearing 20 to the outer end of the heat exchange fin 160, to maximize a heat exchanging time and a heat exchanging area. Therefore, the efficiency of heat exchange between the heat exchange fin 160 and the fluid may increase.

The fluid guide 170 may extend toward an outer end of the heat exchange fin 160, to flow a fluid discharged from the thrust bearing 20 to the outer end of the heat exchange fin 160.

In an embodiment, the fluid guide 170 may be configured in a donut shape extending from the outer side surface of the bearing seat 120 in a radial direction, but is not limited thereto.

The fluid guide 170 may be coupled to an upper end of a portion of the heat exchange fins 160, among the plurality of heat exchange fins 160, to prevent sagging of the fluid guide, but is not limited thereto, and may be coupled to the outer side surface of the bearing seat 120.

Also, in an embodiment, the fluid guide 170 may flow a fluid discharged from the thrust bearing 20 to the inner wall of the fluid storage tank 110, to increase the efficiency of heat exchange between the inner wall of the fluid storage tank 110 and the fluid. In this case, the inner wall of the fluid storage tank 110 may be cooled by transferring heat to the side heat dissipating fin 150.

To this end, the fluid guide 170 may extend, for example, an outer diameter of the fluid guide to 50% to 95% of an inner diameter of the fluid storage tank 110, but is not limited thereto.

In addition, in an embodiment, the fluid guide 170 may be configured to be horizontal to the ground, to facilitate fluidity of a fluid flowing in the radial direction and at the same time to increase a flow rate of a fluid flowing the outer ends of the heat exchange fins 160.

Alternatively, when the fluid guide 170 is sloped in an upward direction as it moves in an outward direction, the fluid may not pass over the fluid guide 170, and may stay in the fluid guide 170. Therefore, circulation of the fluid may not be smooth.

In addition, when the fluid guide 170 is sloped in a downward direction as it moves in an outward direction, a flow rate flowing into a space between the inner upper end of the heat exchange fin 160 and the fluid guide 170 may increase. Therefore, the efficiency of heat exchange between the fluid and the heat exchange fin 160 may be rather reduced.

Also, in an embodiment, the fluid guide 170 may be not excessively spaced apart from the heat exchange fin 160, to maximize the efficiency of heat exchange between the fluid and the heat exchange fin 160.

To this end, the fluid guide 170 may be disposed between an upper end of the fluid flow hole 122 and a 50% position in height of the bearing seat 120, but is not limited thereto, and may be configured to have different sizes depending on height.

The lower heat dissipating fin 180 may be provided on the lower surface of the bottom portion 116 of the fluid storage tank 110, and may exchange heat with the external air. The lower heat dissipating fin 180 may receive heat from the bottom portion 116 of the fluid storage tank 110, and may discharge the heat externally.

In this configuration, the heat of the fluid transferred to the heat exchange fin 160 may be transferred to the lower heat dissipating fin 180 through the bottom portion 116 of the fluid storage tank 110, and the lower heat dissipating fin 180 may exchange the heat with the external air to discharge the transferred heat externally.

In an embodiment, the lower heat dissipating fin 180 may be provided, in plural, at intervals in a radial direction with respect to a center of the fluid storage tank 110.

For example, the lower heat dissipating fin 180 may be configured to correspond to the heat exchange fin 160 in a one-to-one correspondence manner in terms of the number and position, but is not limited thereto.

In an embodiment, the lower heat dissipating fin 180 may have a protruded portion 182 protruding in a radial direction on the bottom portion 116 of the fluid storage tank 110 and disposed below the side heat dissipating fin 150.

In this case, the lower end of the fan guide 142 may be disposed at the upper end of the lower heat dissipating fin 180. The fan guide 142 having such a structure may guide the air flowing by the cooling fan 140 and heat exchanged with the lower heat dissipating fin 180 to the side heat dissipating fins 150. When the lower end of the fan guide 142 is excessively spaced apart from the upper end of the lower heat dissipating fin 180, a flow rate of the air flowing directly to the side heat dissipating fin 150 without passing through the lower heat dissipating fin 180 may increase to deteriorate the efficiency of heat exchange of the lower heat dissipating fin 180.

When the lower heat dissipating fin 180 is excessively high, it may be not easy to introduce the working tool at a distance between the plurality of lower heat dissipating fin 180. Therefore, workability of joining to the lower surface of the bottom portion 116 of the lower heat dissipating fin 180 may be deteriorated.

Therefore, the lower heat dissipating fin 180 may be formed at a relatively low height for assembly workability. When the lower heat dissipating fin 180 is relatively low, there may be a disadvantage that the heat exchange area becomes narrow.

Therefore, in an embodiment, the lower heat dissipating fin 180 may be configured to have larger area toward the protruded portion 182, in a portion coupled to the bottom portion 116 of the fluid storage tank 110, as illustrated in FIGS. 1 and 2. In this case, an air flowing into the side heat dissipating fin 150 may most actively exchange heat in the protruded portion 182 of the lower heat dissipating fin 180.

Figure 3:
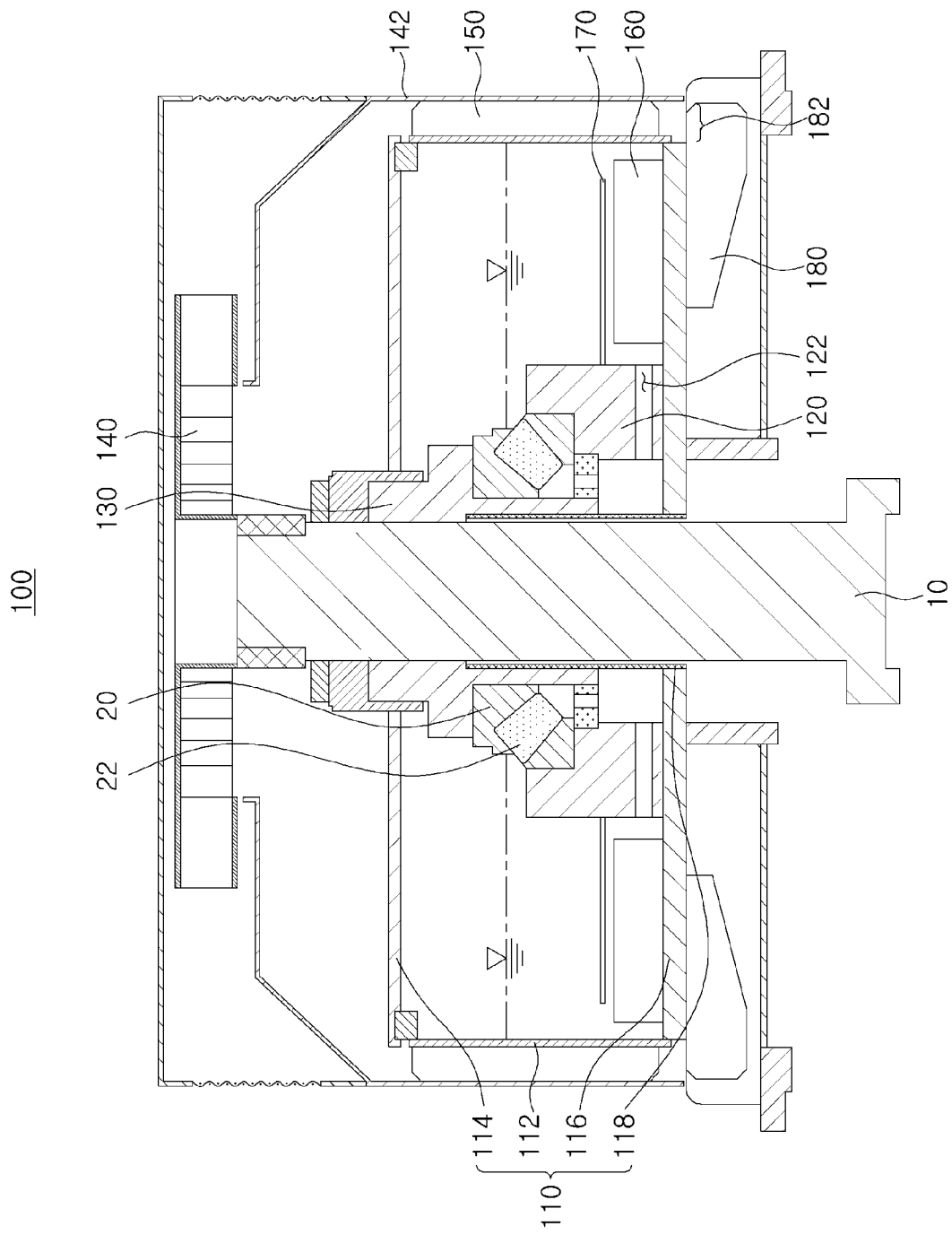
FIG. 3 is a side cross-sectional view illustrating a state in which cooling function of the thrust bearing cooling device illustrated in FIG. 1 is inactivated.
Figure 4:
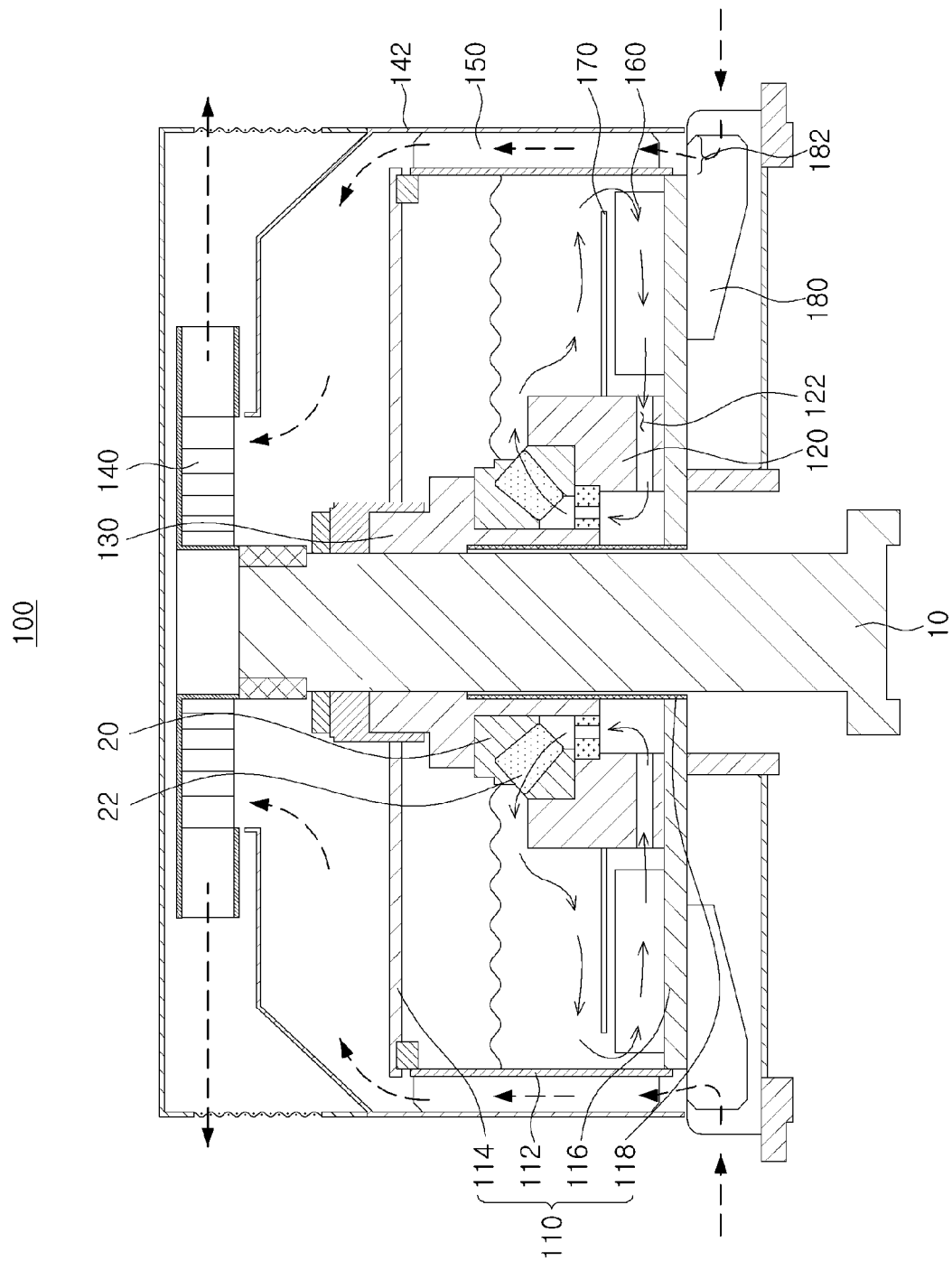
FIG. 4 is a side cross-sectional view illustrating a state in which cooling function of the thrust bearing cooling device illustrated in FIG. 1 is activated.

FIG. 3 illustrates a state in which cooling function of the thrust bearing cooling device 100 according to an embodiment of the present disclosure is inactivated. FIG. 4 illustrates a state in which cooling function of the thrust bearing cooling device 100 according to an embodiment of the present disclosure is activated.

In this case, the cooling function of the thrust bearing 20 may be activated, in conjunction with the rotation of the rotary shaft 10 of the vertical electric motor.

As illustrated in FIG. 3, the fluid may be stored in the fluid storage tank 110 at a level approximating a height of a portion from which the fluid of the thrust bearing 20 is discharged.

When the rotary shaft 10 coupled to the thrust bearing 20 rotates, the fluid stored in the fluid storage tank 110 may be circulated via the thrust bearing 20, as illustrated in FIG. 4, and the external air may flow along the side surface at the lower end of the fluid storage tank 110 by the cooling fan 140.

In this case, the fluid circulating in the fluid storage tank 110 may cool the thrust bearing 20, and transfer heat to the fluid storage tank 110 and the heat exchange fin 160.

The heat transferred to the heat exchange fin 160 may be transferred to the lower heat dissipation fin 180 through the bottom portion 116 of the fluid storage tank 110, and the lower heat dissipation fin 180 may exchange the heat with the air, to release the heat externally.

In this case, since the lower heat dissipating fin 180 may be initially a component in which heat is not exchanged with other components, the heat may be relatively exchanged with the ambient air having the lowest temperature. Therefore, the present disclosure may have an advantage that cooling performance of the fluid is remarkably improved by the heat dissipating fin 180 and the heat exchange fin 160 transmitting heat to the lower heat dissipating fin 180.

While example embodiments have been illustrated and described above, it will be apparent to those skilled in the art that modifications and variations could be made without departing from the scope of the present disclosure as defined by the appended claims.

The invention claimed is:

1. A thrust bearing cooling device comprising:
   a fluid storage tank in which a thrust bearing is installed and a fluid is stored, an outer surface of the fluid storage tank being exposed to external air;
   at least one heat exchange fin coupled to a bottom portion of the fluid storage tank in the fluid storage tank; and
   at least one lower heat dissipating fin provided on a lower surface of the bottom portion outside the fluid storage tank,
   wherein the lower heat dissipating fin has a protruded portion protruding in a radial direction on the bottom portion of the fluid storage tank, and
   wherein the lower heat dissipating fin has a surface area increasing in a direction from a portion of the lower heat dissipating fin, coupled to the bottom portion of the fluid storage tank, to the protruded portion of the lower heat dissipating fin.

2. The thrust bearing cooling device according to claim 1, wherein the heat exchange fin is disposed, in plural, at intervals in a circumferential direction of the thrust bearing.

3. The thrust bearing cooling device according to claim 2, wherein the plurality of heat exchange fins are provided in the radial direction with respect to the thrust bearing.

4. The thrust bearing cooling device according to claim 3, further comprising a fluid guide, having a plate-shape, covering an upper portion of the plurality of heat exchange fins.

5. The thrust bearing cooling device according to claim 4, wherein the fluid guide extends toward an outer end of the heat exchange fin, to flow the fluid discharged from the thrust bearing to the outer end of the heat exchange fin.

6. The thrust bearing cooling device according to claim 4, wherein the fluid guide extends an outer diameter of the fluid guide to 50% to 95% of an inner diameter of the fluid storage tank, to flow the fluid discharged from the thrust bearing to an inner wall of the fluid storage tank.

7. The thrust bearing cooling device according to claim 4, wherein the fluid guide is horizontal to the ground.

8. The thrust bearing cooling device according to claim 7, further comprising a bearing seat provided in the fluid storage tank and fixing the thrust bearing to the bottom portion of the fluid storage tank,
   wherein the bearing seat has a fluid flow hole formed to pass through from an outer surface of the bearing seat to an inner surface of the bearing seat in the radial direction, and
   the fluid guide is disposed between an upper end of the fluid flow hole and a 50% position in height of the bearing seat.

9. The thrust bearing cooling device according to claim 2, further comprising a bearing seat provided in the fluid storage tank and fixing the thrust bearing to the bottom portion of the fluid storage tank,
   wherein the bearing seat has fluid flow holes formed to pass through from an outer side surface of the bearing seat to an inner side surface of the bearing seat in the radial direction,
   wherein the fluid flow holes are formed at intervals in the circumferential direction of the bearing seat, and
   the plurality of heat exchange fins are disposed such that first ends of the heat exchange fins face the fluid flow holes, respectively.

10. The thrust bearing cooling device according to claim 9, wherein the heat exchange fins have the first ends spaced apart from the bearing seat.

11. The thrust bearing cooling device according to claim 1, wherein the lower heat dissipating fin is provided, in plural, at intervals in the radial direction with respect to a center of the fluid storage tank.

12. The thrust bearing cooling device according to claim 11, further comprising at least one side heat dissipating fin provided on an outer surface of a side wall of the fluid storage tank.

13. The thrust bearing cooling device according to claim 12, wherein the protruded portion is disposed below the side heat dissipating fin.

14. A thrust bearing cooling device comprising:
    a fluid storage tank in which a thrust bearing is installed and a fluid is stored, an outer surface of the fluid storage tank being exposed to external air;
    at least one lower heat dissipating fin provided on a lower surface of a bottom portion of the fluid storage tank; and
    a plurality of side heat dissipating fins provided on an outer surface of a side wall of the fluid storage tank,
    wherein the lower heat dissipating fin has a protruded portion protruding in a radial direction on the bottom portion of the fluid storage tank and disposed below the plurality of side heat dissipating fins, and
    wherein the lower heat dissipating fin has an increasing surface area in a direction from a portion of the lower heat dissipating fin, coupled to the bottom portion of the fluid storage tank, to the protruded portion of the lower heat dissipating fin.

15. A thrust bearing cooling device comprising:
    a fluid storage tank in which a thrust bearing is installed and a fluid is stored, an outer surface of the fluid storage tank being exposed to external air;
    at least one lower heat dissipating fin provided on a lower surface of a bottom portion of the fluid storage tank;
    a plurality of side heat dissipating fins provided on an outer surface of a side wall of the fluid storage tank
    a cooling fan disposed above the fluid storage tank and fastened to a rotary shaft coupled to the thrust bearing; and
    a fan guide surrounding the fluid storage tank and the plurality of side heat dissipating fins and guiding an air flowing by suction force of the cooling fan to the cooling fan,
    wherein the lower heat dissipating fin has a protruded portion protruding in a radial direction on the bottom portion of the fluid storage tank and disposed below the plurality of side heat dissipating fins, and
    wherein a lower end of the fan guide is disposed on an upper end of the lower heat dissipating fin.

* * * * *